Figure 1:
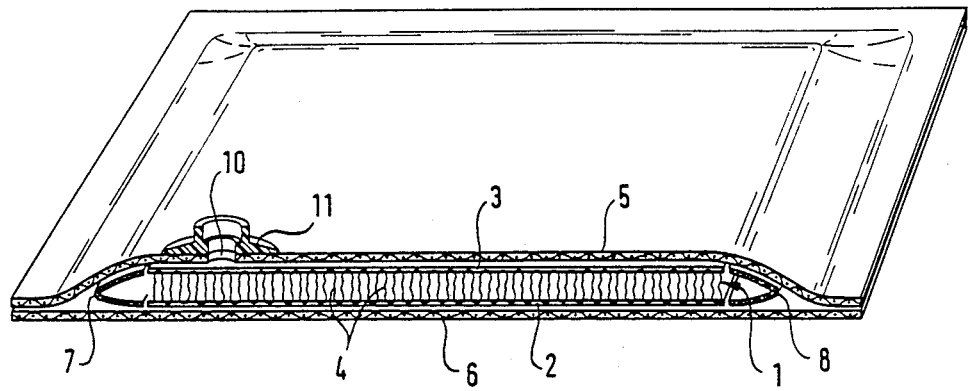

United States Patent [19]

Härtel et al.

[11] Patent Number: 4,846,917
[45] Date of Patent: Jul. 11, 1989

[54] METHOD OF PRODUCING AN INFLATABLE HOLLOW BODY

[75] Inventors: Volker Härtel, Germering; Gerhard Höglinger, Rosenheim; Hans Schreiber, Gröbenzell, all of Fed. Rep. of Germany

[73] Assignee: Metzeler GmbH, Munich, Fed. Rep. of Germany

[21] Appl. No.: 97,598

[22] Filed: Sep. 16, 1987

Related U.S. Application Data

[63] Continuation-in-part of Ser. No. 774,080, Sep. 9, 1985, abandoned.

[30] Foreign Application Priority Data

Sep. 8, 1984 [DE] Fed. Rep. of Germany ....... 3433113
Sep. 25, 1984 [DE] Fed. Rep. of Germany ....... 3435157

[51] Int. Cl.$^4$ ........................ B32B 31/20; B32B 31/26
[52] U.S. Cl. ..................................... 156/286; 156/292; 156/307.7; 156/308.4; 264/512
[58] Field of Search ............... 156/275.1, 275.3, 275.5, 156/285–287, 289, 292, 307.7, 290, 308.4, 110.1, 87, 118, 130.5; 264/130, 511–512, 545–546; 5/449, 455, 457–458; 297/DIG. 3; 273/67, 41; 428/35, 69, 224, 289, 290

[56] References Cited

U.S. PATENT DOCUMENTS

| 2,269,342 | 1/1942 | Johnson | 156/289 |
| 2,429,123 | 10/1947 | Crowley | 156/286 |
| 3,205,106 | 9/1965 | Cross | 5/458 |
| 3,427,705 | 2/1969 | Campbell | 156/163 |
| 3,713,930 | 1/1973 | Levrini | 297/DIG. 3 |

Primary Examiner—Merrell C. Cashion, Jr.
Attorney, Agent, or Firm—Herbert L. Lerner; Laurence A. Greenberg

[57] ABSTRACT

A method for producing and vulcanizing an inflatable hollow body from a double cloth having upper and lower plies with edges and pile yarns spacing the plies apart includes applying a respective gas-tight unvulcanized layer of rubber to each of the upper and lower plies of the double cloth. The edges of the upper and lower plies are joined with angle braces forming a hollow body. The hollow body is evacuated over a predetermined period of time and the hollow body is vulcanized in the evacuated state.

1 Claim, 1 Drawing Sheet

METHOD OF PRODUCING AN INFLATABLE HOLLOW BODY,

CROSS-REFERENCE TO RELATED APPLICATIONS:

This application is a continuation-in-part of Ser. No. 774,080, filed Sept. 9, 1985 now abandoned.

The invention relates to a method for producing an inflatable hollow body from a double cloth with plies spaced apart by pile yarns, in which a respective gas-tight unvulcanized layer of natural rubber is applied to the upper and lower plies of the double cloth and the edges of the double cloth are joined with angle braces.

A hollow body made of this kind of double cloth or textile fabric, which is generally known as pile cloth or pile fabric, is known in principle from German Published, Prosecuted Application DE-AS 21 48 401 and is used in particular for producing inflatable boats. Heretofore, it was always a matter of considerable difficulty to join the upper and lower plies of the pile cloth to gas-tight plies of natural rubber and to firmly glue the plies of natural rubber to the plies of the double cloth without unsightly wrinkles or shifting of the individual layers relative to one another. It is accordingly an object of the invention to provide a method of producing an inflatable hollow body from a double cloth, which overcomes the hereinafore-mentioned disadvantages of the heretofore-known methods of this general type and with which high pressing forces and long contact times for the individual parts to be joined together can be attained in a simple manner, so that it is even possible to dispense with a separate adhesive solution with a number of rubber coating mixtures.

With the foregoing and other objects in view there is provided, in accordance with the invention, a method for producing and vulcanizing an inflatable hollow body from a double cloth having upper and lower plies with edges and pile yarns spacing the plies apart, which comprises applying a respective gas-tight unvulcanized layer of rubber to each of the upper and lower plies of the double cloth, joining the edges of the upper and lower plies with angle braces forming a hollow body, evacuating the hollow body over a predetermined period of time, and vulcanizing the hollow body in the evacuated state. It is thus possible to join the layers through the use of a vacuum, without adhesive.

In accordance with another mode of the invention, there is provided a method which comprises evacuating air from the hollow body by suction through a heat-resistant and vacuum-tight valve inserted into the hollow body.

In accordance with a concomitant mode of the invention, there is provided a a method which comprises reinforcing the unvulcanized layer of rubber with a woven fabric.

The advantages attainable with the invention are in particular that because of the evacuation of the interior of the prefabricated hollow body, all the seams and cloth plies can be joined together in the absence of air, so that the finished articles produced are absolutely free of bubbles. Any defects or leaks in the parts are apparent immediately after vulcanization, due to the fact that such parts are not pressed flat against one another but instead appear slightly inflated, because of the ingress of steam.

Another advantage is the savings in labor and material, as well as the improved appearance of the surfaces of parts having a large surface area, since their appearance is not marred by small inclusions of air.

Both plies of the double cloth used for producing the hollow body are kept spaced apart from one another by yarn extending at right angles to the plies. The advantage of this structure is that parts can be obtained that have parallel surfaces spaced apart by a constant distance and that are particularly well suited for the bottoms or side walls of inflatable boats. However, when a double cloth of this type is used, the upper and lower plies must be coated with gas-tight covering layers of natural rubber or conventionally coated cloth, in order to make them airtight; previously, these covering layers had to be joined to the plies of the double cloth by a particularly labor-intensive method.

Other features which are considered as characteristic for the invention are set forth in the appended claims.

Although the invention is illustrated and described herein as embodied in a method of producing an inflatable hollow body, it is nevertheless not intended to be limited to the details shown, since various modifications may be made therein without departing from the spirit of the invention and within the scope and range of equivalents of the claims.

The method of operation of the invention, however, together with additional objects and advantages thereof will be best understood from the following description of specific embodiments when read in connection with the accompanying drawings.

Figure 2:
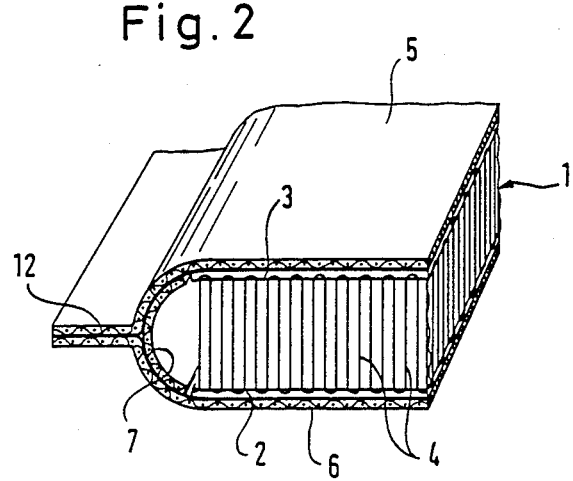

FIG. 1 is a fragmentary, diagrammatic, cross-sectional view of a prefabricated double cloth or textile fabric, in which the individual layers are shown as being slightly spaced apart from one another; and FIG. 2 is an enlarged, fragmentary, cross-sectional view of a vulcanized double cloth or textile fabric in the inflated state.

Referring now to the figures of the drawings in detail and first, particularly, to FIG. 1 thereof, there is seen a double cloth or textile fabric 1 used for producing a hollow body, having two plies or sheets 2 and 3 which are kept apart by yarns or threads 4 extending at right angles to the plies. The advantage of this structure is that it permits the fabrication of parts having parallel surfaces which are spaced apart from one another by a constant distance. Such parts are particularly well suited for the bottoms or side walls of inflatable boats or for inflatable mattresses. However, if a double cloth 1 of this kind is used, then the upper and lower plies 2 and 3 must be coated with gas-tight cover layers 5 and 6 in order to be made air-tight. The cover layers 5 and 6 may be made of unvulcanized rubber or conventional cloth coated with rubber. The drawings show threads in the rubber layers reinforced with fabric. Heretofore, these cover layers had to be joined with the double cloth plies by a particularly labor-intensive method.

According to the invention, these natural rubber or caoutchouc plies 5 and 6, which may optionally be fabric-reinforced or may be in the form of a fabric coated on both sides with natural rubber, are simply applied to the upper and lower plies 2 and 3 in the unvulcanized state. In practice, this is done by first smoothly spreading out the coated ply 6 and then placing the double cloth 1, which has been cut to a pattern, upon the coated ply 6. Angle braces 7 and 8, which are also made of coated fabric like the plies 5 and 6, are then put in place on the sides. The coated upper ply 5 is then placed on the others. All of the contacting surfaces between the double cloth 1 and the plies 5 and 6, as well as between these plies themselves and the angle braces 7 and 8, are suitably painted beforehand with an adhesion promoter. All of the surfaces and edges to be joined are then briefly pre-pressed with a pressing roller and a heat-resistant and vacuum-tight valve is inserted into a prepared valve hole 10. Only a directly attached valve base 11 of the valve is shown in the drawing.

Following pre-fabrication performed in the manner described above, a non-illustrated vacuum pump is connected to the valve 11 and the interior of the double cloth is evacuated. All of the air inclusions in the cloth, at the seams and in particular between the rubber covering 5 and 6 and the double cloth layers 2 and 3, are completely removed in this way. The vacuum-tight valve 11 is then closed, so that the negative pressure generated in the hollow body is maintained. A pressure difference of 10 N/cm² results in all of the cloth layers being pressed firmly together. The contact time at this pressure is long enough to cause the coated layers that are to be fused to flow and diffuse into one another fully. The longer the contact time, the greater the depth to which the natural rubber layers can diffuse into the plies of the double cloth and the depth of penetration in turn affects the strength of the seam and adhesive bond.

Once the desired contact time has elapsed, the hollow body is introduced into a vulcanization chamber and vulcanized in the evacuated state. An increasing pressure difference from 1 bar initially to approximately 6–7 bar, causes an even better fusion of the seams to be obtained and at the same time they are hardened by the vulcanization.

In FIG. 2, a portion of a double cloth produced in this way is shown in the inflated state. From the drawing, it is particularly clear that in the inflated state all of the layers rest firmly on one another, thus forming a firm composite structure. Both the relatively wide protruding seam and the angle brace 7 that firmly contacts the point at which the lower ply 6 and the upper ply 5 meet, contribute to effecting secure sealing.

The cloth which is used, namely the double cloth or the covering cloth plies, may be made from conventional materials, such as polyester, polyamide or aramide. Natural rubber mixtures which have been conventionally used previously, can also be used.

Particularly good results are obtained by used NK/CR solutions as an adhesion promoter between the layers and the edges to be joined and the action thereof can be even further reinforced by adding Desmodur.

The aspiration or sucking of the rubber layers into the cloth produces a rubber/cloth bond of considerably improved adhesion strength, which in numerous cases makes it possible to dispense with the otherwise required painting solution for improving adhesion of the cloth and may even make it possible to dispense with the use of adhesive solutions.

We claim:

1. Method for producing and vulcanizing an inflatable hollow body from a double cloth having upper and lower cloth plies of given area with edges and pile yarns spacing the plies apart, which comprises producing the inflatable hollow body by placing the double cloth onto a first smooth unvulcanized rubber layer having an area greater than the given area of the cloth plies defining a first peripheral region of the first rubber layer protruding freely beyond the double cloth all around, placing folded angle braces of unvulcanized rubber on the first peripheral region along the edges of the plies of the double cloth, subsequently placing a second smooth unvulcanized rubber layer of the same size as the first rubber layer on the double cloth and the angle braces defining a second peripheral region of the second rubber layer protruding freely beyond the double cloth all around and a hollow space remaining between the rubber layers, pressing the protruding peripheral regions of the first and second rubber layers, subsequently evacuating the hollow space remaining between the first and second rubber layers with a valve inserted in the second rubber layer, and maintaining the vacuum until the material of the rubber layers partially enters into the plies of the double cloth; and subsequently vulcanizing the hollow body while maintaining the vacuum for air-tightly laminating the double cloth with the first and second rubber layers.

* * * * *